United States Patent
Makabe et al.

(10) Patent No.: US 11,902,035 B2
(45) Date of Patent: Feb. 13, 2024

(54) REDUNDANCY METHOD, COMPUTER-READABLE RECORDING MEDIUM, AND INFORMATION PROCESSING DEVICE

(71) Applicant: YOKOGAWA ELECTRIC CORPORATION, Musashino (JP)

(72) Inventors: Hiroyuki Makabe, Tokyo (JP); Masanobu Tsuchiya, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/721,652

(22) Filed: Apr. 15, 2022

(65) Prior Publication Data

US 2022/0345258 A1  Oct. 27, 2022

(30) Foreign Application Priority Data

Apr. 27, 2021  (JP) ................ 2021-075209

(51) Int. Cl.
*H04L 1/22* (2006.01)
*H04L 27/01* (2006.01)
*H04W 28/18* (2009.01)

(52) U.S. Cl.
CPC ............ *H04L 1/22* (2013.01); *H04L 27/01* (2013.01); *H04W 28/18* (2013.01)

(58) Field of Classification Search
CPC ...... H04L 1/22; H04L 12/40176; G06F 11/16; G06F 11/20
See application file for complete search history.

(56) References Cited

U.S. PATENT DOCUMENTS

| | | | |
|---|---|---|---|
| 5,966,304 A | 10/1999 | Cook et al. | |
| 6,400,730 B1 * | 6/2002 | Latif | H04L 69/16 370/466 |

(Continued)

FOREIGN PATENT DOCUMENTS

| | | | |
|---|---|---|---|
| JP | 2004-171379 A | 6/2004 | |
| JP | 4399773 B2 | 1/2010 | |

(Continued)

OTHER PUBLICATIONS

The Extended European Search Report dated Sep. 16, 2022, issued in counterpart EP Application No. 22169046.4. (8 pages).

(Continued)

*Primary Examiner* — Benjamin Lamont
(74) *Attorney, Agent, or Firm* — WHDA, LLP

(57) ABSTRACT

In an information processing device, a communication control unit performs communication using a first communication method and using a second communication method that is faster than the first communication method. An equalizing unit performs an equalization operation using the first communication method with respect to a first information processing device in a redundancy system in which redundancy is achieved between the first information processing device and a second information processing device using the first communication method. After the equalization operation is completed by the equalizing unit, another equalizing unit performs the equalization operation using the second communication method with respect to a third information processing device, and builds a redundancy system in which the concerned information processing device and the third information processing device are used.

7 Claims, 5 Drawing Sheets

(56) References Cited

U.S. PATENT DOCUMENTS

| | | | |
|---|---|---|---|
| 2004/0049774 A1* | 3/2004 | Boyd | G06F 13/385 714/E11.078 |
| 2006/0067387 A1* | 3/2006 | Ahmed | H04B 10/07 375/219 |
| 2007/0078980 A1 | 4/2007 | Tomita et al. | |
| 2009/0187668 A1* | 7/2009 | Arendt | G06F 11/2023 709/230 |
| 2014/0047263 A1* | 2/2014 | Coatney | G06F 11/2092 711/119 |
| 2015/0142981 A1* | 5/2015 | Gonzales | H04L 69/08 709/227 |
| 2016/0283251 A1* | 9/2016 | Enomoto | G06F 9/4411 |
| 2020/0394146 A1 | 12/2020 | McLaughlin et al. | |

FOREIGN PATENT DOCUMENTS

| | | |
|---|---|---|
| JP | 6299640 B2 | 3/2018 |
| WO | 2005/050336 A1 | 6/2005 |

OTHER PUBLICATIONS

Office Action dated Jul. 25, 2023, issued in counterpart JP application No. 2021-075209, with English translation. (5 pages).

\* cited by examiner

REDUNDANCY METHOD, COMPUTER-READABLE RECORDING MEDIUM, AND INFORMATION PROCESSING DEVICE

CROSS-REFERENCE TO RELATED APPLICATION(S)

The present application claims priority to and incorporates by reference the entire contents of Japanese Patent Application No. 2021-075209 filed in Japan on Apr. 27, 2021.

FIELD

The present invention is related to a redundancy method, a computer-readable recording medium, and an information processing device.

BACKGROUND

Conventionally, in a manufacturing plant or a factory (hereinafter, simply referred to as a "plant"), a process control system is built for controlling various state quantities (for example, pressure, temperature, and flow rate) in the industry processes; and hence sophisticated autonomous operations are put into practice. More particularly, for example, as disclosed in patent literatures 1 to 3, Japanese Patent No. 4399773, International Unexamined Patent Application No. 2005/050336, and U. S. Unexamined Patent Application Publication No. 2007/0078980, the controller that forms the core of a process control system obtains the detection results of a plurality of sensors (flowmeters and thermometers); obtains the operation amounts of actuators (valves) according to the detection results; and operates the actuators according to the operation amounts. As a result, the various state quantities get controlled.

Such a process control system is mostly required to perform continuous operations over a long period of time in units of months or years. Hence, the process control system in the running state cannot be stopped at will. For example, the process control system is essentially not allowed to be stopped, other than the stoppage meant for periodic maintenance or a shutdown meant for the safety of the plant.

On the other hand, in a process control system, due to the sophistication achieved in production control and due to the coordination performed with external systems, it has become a common practice to perform the production control using a general-purpose PC that is low on reliability as compared to a dedicated control device. In that case, in order to ensure that the process control system is not stopped even if malfunctioning occurs in a general-purpose PC, a configuration is adapted in which redundancy of the applications is achieved using two or more general-purpose PCs, and the continuity in the data and the operating condition of the applications is maintained.

Given below is the explanation of a system in which a redundancy configuration is adapted in two PCs. In a redundancy system in which a redundancy configuration is adapted in two PCs (hereinafter, such a configuration is representatively referred to as a redundancy system); among the general-purpose PCs used for achieving redundancy (a general-purpose PC represents an example of an information processing device, and is also referred to as a redundancy PC), an equalization network is built between the active side and the standby side using a general-purpose network interface card (NIC). Then, in the redundancy PCs, equalization of the data and the operating condition of the applications is performed from the active side with respect to the standby side. Thus, even if malfunctioning occurs in one of the general-purpose PCs, the other general-purpose PC that is in the running state continues with the production control.

The condition of the two redundancy PCs (i.e., whether or not malfunctioning has occurred, or the active/standby state of each general-purpose PC) can be monitored using a redundancy management tool provided in the human machine interface (HMI), and it is possible to issue an instruction for changing the condition (i.e., switching between the active state and the standby state, or shutting down or rebooting a general-purpose PC).

In the redundancy system, the performance of equalization is a significant factor in deciding the performance of the redundancy system. That is because, until the equalization between the active side and the standby side is complete, the operations of the redundancy system needs to be temporarily stopped at a particular timing. Herein, if the level of the communication performance of the equalization network is high or if the level of the performance of the equalization itself is high, the time required for completing the equalization becomes shorter, and accordingly the period of temporary stoppage of the operations becomes shorter. That results in the enhancement of the performance of the redundancy system.

As far as the lifecycle of a general-purpose PC or the lifecycle of an external system operating in coordination is concerned, as compared to the lifecycle of a process control system, the technological development happens at a faster rate and thus the product lifecycle is shorter. Hence, in order to enhance the performance of the redundancy system, sometimes the existing general-purpose PC on the active side or the standby side is replaced with a new-type general-purpose PC capable of performing equalization at a faster rate. Moreover, due to a short product lifecycle, it becomes difficult to procure the same model or an equivalent model of a general-purpose PC to be replaced. Hence, sometimes the existing general-purpose PCs on both the active and standby sides are unavoidably replaced with new-type general-purpose PCs.

<Patent Literature 4> Japanese Patent No. 6299640

However, in the conventional technology, when the general-purpose NIC provided in new-type general-purpose PC or the equalization method adapted in a new-type general-purpose PC does not have compatibility with the existing general-purpose PC, then some downtime is required for performing the replacement task. Conventionally, at the time of performing the replacement task, the existing general-purpose PCs on both the active and standby sides are stopped, and the new-type general-purpose PC on the active side is activated only after the restoration of the backup. At that time, about one hour required for taking the backup, about a few tens of minutes required for hardware replacement, and about one hour required for the restoration accounts for the downtime during which the redundancy PCs are cut off from the process production control system.

Moreover, not only an external storage is required for storing the backup, there is also a risk of failure in obtaining the backup or handling the backup, which may make the restoration impossible.

In view of the issues explained above, it is an objective to enable replacement of existing information processing devices in a redundancy system by new-type information processing devices without requiring any downtime.

SUMMARY

According to one aspect of embodiments, a redundancy method implemented in an information processing device that performs communication using a first communication method and using a second communication method that is faster than the first communication method, comprises performing equalization operation using the first communication method with respect to a first information processing device in a redundancy system in which redundancy is achieved between the first information processing device and a second information processing device using the first communication method; and building that includes performing, after completion of the equalization operation, equalization operation using the second communication method with respect to a third information processing device, and building a redundancy system in which the information processing device and the third information processing device are used.

According to one aspect of embodiments, a computer-readable recording medium stores therein a redundancy program, wherein the redundancy program causes a computer to execute performing communication using a first communication method and using a second communication method that is faster than the first communication method; performing equalization operation using the first communication method; performing equalization operation using the second communication method; and determining, using the first communication method, whether or not other information processing device has adapted the second communication method.

According to one aspect of embodiments, an information processing device comprises a communication control unit that performs communication using a first communication method and using a second communication method that is faster than the first communication method; a first equalizing unit that performs equalization operation using the first communication method; a second equalizing unit that performs equalization operation using the second communication method; and a determining unit that uses the first communication method and determines whether or not other information processing device has adapted the second communication method.

DESCRIPTION OF EMBODIMENTS

Figure 1:
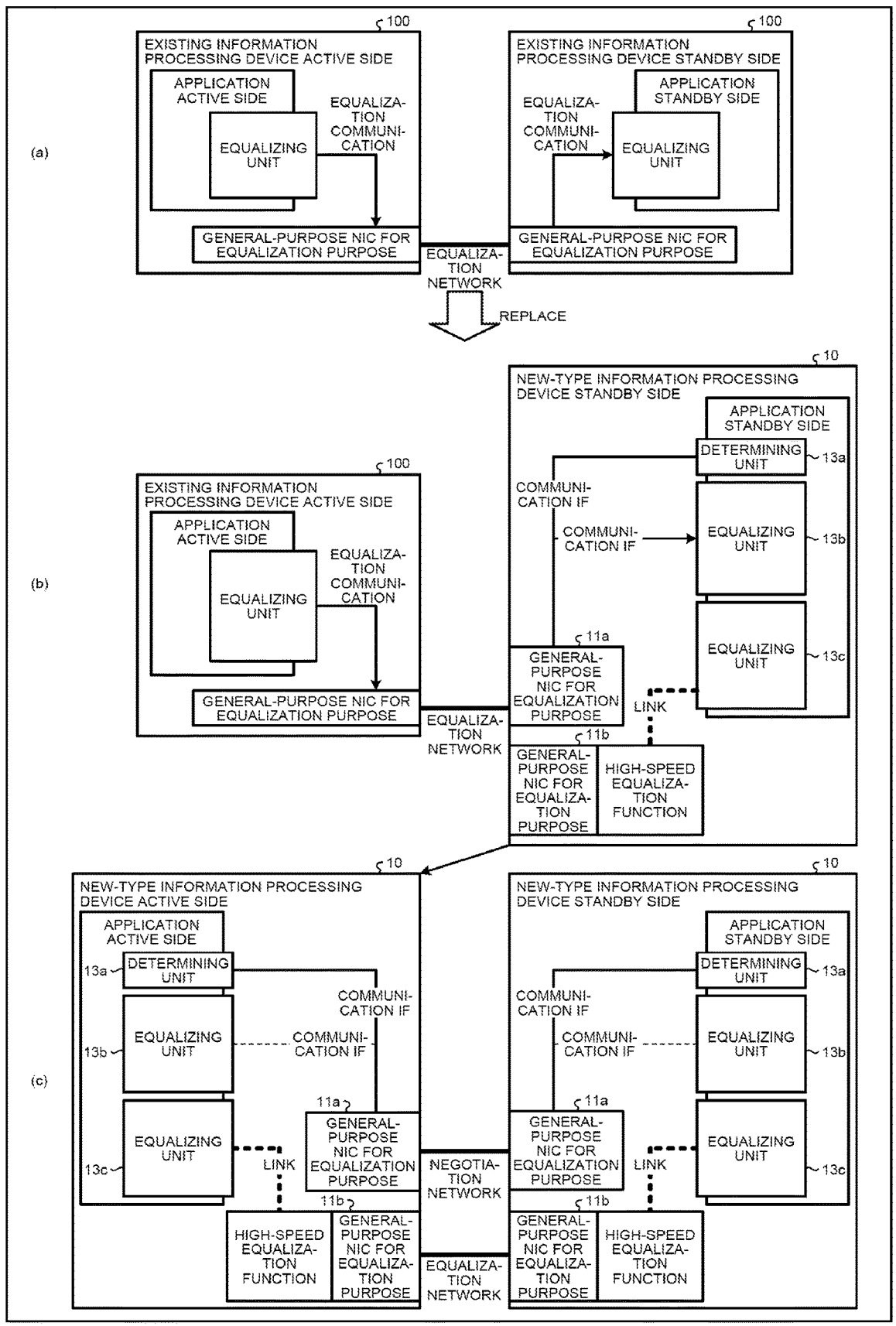
FIG. 1 is a diagram for explaining a system configuration according to an embodiment.

An exemplary embodiment of a redundancy method, a redundancy program, and an information processing device is described below in detail with reference to the accompanying drawings. However, the present invention is not limited by the embodiment described below. Herein, the identical elements are referred to by the same reference numerals, and the same explanation is not repeated. Meanwhile, embodiments can be appropriately combined without causing any contradictions.

<Overall Configuration>

FIG. 1 is a diagram for explaining a system configuration according to the present embodiment. In each information processing device constituting a process production control system, the data and the operating condition of applications is equalized and redundancy is achieved.

For example, each information processing device is connected to a control network that is built exclusively for controlling the plant. As an example, via the control network, each information processing device sends a variety of data to and receives a variety of data from a controller that controls the sensors and the actuators in the plant. As far as the control network is concerned, for example, Vnet/IP (registered trademark) can be used.

Moreover, each information processing device is connected to an upper-level network that is used for monitoring the plant. For example, via the upper-level network, each information processing device sends a variety of data to or receives a variety of data from a monitoring terminal that is compatible to the open platform communications (OPC). As far as the upper-level network is concerned, it is possible to use a variety of communication networks such as a local area network (LAN) or the Internet.

In the present embodiment, existing information processing devices 100 illustrated in (a) in FIG. 1 or new-type information processing devices 10 illustrated in (c) in FIG. 1 according to the present embodiment constitute a redundancy system in which the data and the operating condition of the applications is equalized between the active side and the standby side. The information processing devices 10 according to the present embodiment perform communication using a first communication method and using a second communication method that is faster than the first communication method.

As a result of performing a redundancy operation according to the present embodiment, the existing information processing devices 100, which are used on the active side and the standby side of the redundancy system as illustrated in (a) in FIG. 1, are replaced by the information processing devices 10 according to the present embodiment, which are equipped with a high-speed communication function, as illustrated in (c) in FIG. 1.

Firstly, as illustrated in (b) in FIG. 1, during the operations of the process production control system, the information processing device 10 according to the present embodiment is used on the standby side of the redundancy system, and equalization is performed with the existing information processing device 100. At that time, in the information processing device 10, a determining unit 13a determines that, between the existing communication method and the high-speed communication method, the existing communication method is to be used in accordance with the existing information processing device 100. Moreover, via a general-purpose NIC 11a for equalization purpose (NIC stands for Network Interface Card) that implements the existing communication method, an equalizing unit 13b (a first equalizing unit) that is compatible to the existing communication method performs an equalization operation.

Then, as illustrated in (c) in FIG. 1, after equalization with respect to the existing information processing device 100 is completed, the information processing device 10 is used on the active side; and another information processing device 10 (a third information processing device) is used on the standby side. Subsequently, equalization is performed between the two information processing devices 10. At that time, via the general-purpose NIC 11a for equalization purpose that is meant for implementing the existing communication method, the determining unit 13a performs negotiation about whether to use the existing communication method or the high-speed communication method, and determines that the high-speed communication method is to be used. Then, via a general-purpose NIC 11b for equalization purpose that is meant for implementing the high-speed communication method, an equalizing unit 13c (a second equalizing unit) that is compatible to the high-speed communication method performs the equalization operation.

As a result, while keeping the process production control system in operation, the redundancy system illustrated in (a) in FIG. 1 gets replaced by the redundancy system illustrated in (c) in FIG. 1. In this way, in the redundancy system, the existing information processing devices 100 can be replaced with the new-type information processing devices 10 according to the present embodiment at a fast rate and without requiring any downtime.

<Functional Configuration>

Figure 2:
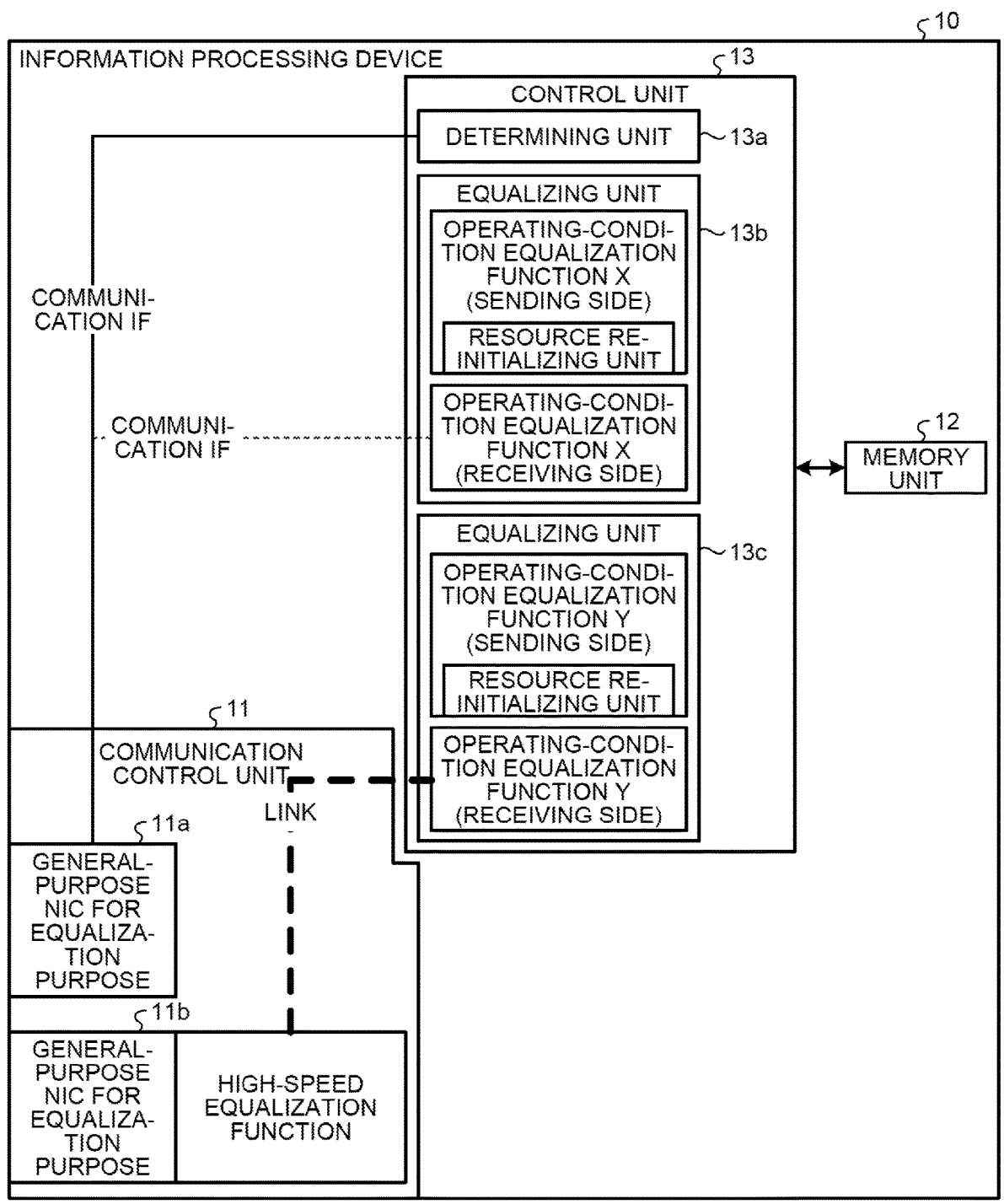
FIG. 2 is a functional block diagram illustrating a functional configuration of an information processing device according to the present embodiment.

FIG. 2 is a functional block diagram illustrating a functional configuration of the information processing device 10 according to the present embodiment. As illustrated in FIG. 2, the information processing device 10 includes a communication control unit 11, a memory unit 12, and a control unit 13. The information processing device 10 is not limited to include the function units mentioned above, and can also include other function units such as a display unit configured with a display.

The communication control unit 11 is a processing unit that controls the communication with other devices, and is implemented using, for example, a communication interface. In the present embodiment, the communication control unit 11 includes the general-purpose NICs 11a and 11b for equalization purpose. As a result, the information processing device 10 performs communication using the first communication method and using the second communication method that is faster than the first communication method.

The general-purpose NIC 11a for equalization purpose controls the communication performed using the existing communication method (the first communication method). The general-purpose NIC 11b for equalization purpose controls the communication performed using the high-speed communication method (the second communication method). The first communication method and the second communication method have different protocols implemented therein. For example, the first communication method is based on the Ethernet (registered trademark) technology, and the second communication method is based on the remote direct memory access (RDMA; refer to RFC5040).

Then, the equalizing unit 13b (the first equalizing unit) (explained later) performs communication with another information processing device (10, 100) via the general-purpose NIC 11a for equalization purpose. Moreover, the equalizing unit 13c (the second equalizing unit) (explained later) performs communication with the other information processing device 10 using the high-speed equalization function of the general-purpose NIC 11b for equalization purpose. If the equalizing unit 13b corresponding to the first communication method is compared with the equalizing unit 13c corresponding to the second communication method; a high-speed communication method is implemented in the equalizing unit 13c, that is, a communication protocol and a data reception mechanism suitable for equalization and having less overhead is implemented in the equalizing unit 13c, and the method for referring to the data received from an application is also implemented at a fast rate (example: when the RDMA is implemented as the communication method, the received data can be directly delivered to the memory area of the application using the direct memory access (DMA)). Hence, the equalizing unit 13c can perform the equalization operation at a faster rate than the equalizing unit 13b.

The memory unit 12 is a processing unit used to store a variety of data and various computer programs executed by the control unit 13; and is implemented using, for example, a memory or a hard disk. The memory unit 12 is used to store the data obtained during the various operations performed by the control unit 13, to store the processing results obtained as a result of performing the various operations, and to store a variety of data generated during the operations performed by the information processing device 10.

The control unit 13 is a processing unit that controls the information processing device 10 in entirety, and is implemented using, for example, a processor. The control unit 13 includes the determining unit 13a, the equalizing unit 13b (the first equalizing unit), and the equalizing unit 13c (the second equalizing unit).

The equalizing unit 13b uses the first communication method and performs the equalization operation with respect to an existing first information processing device 100 in a redundancy system in which redundancy is achieved between the existing first information processing device 100 and a existing second information processing device 100 using the first communication method.

More particularly, as illustrated in (b) in FIG. 1, with respect to the information processing device 100 on the active side in the existing redundancy system, the equalizing unit 13b performs the equalization operation regarding the data and the operating condition via the general-purpose NIC 11a for equalization purpose that implements communication using the first communication method.

Meanwhile, as illustrated in FIG. 2, the equalizing unit 13b includes an operating-condition equalization function X for the receiving side, includes an operating-condition equalization function X for the sending side, and includes a resource reinitializing unit for the functions X. When the communication method is changed, the resource reinitializing unit performs an initialization operation with respect to the resources such as the memory.

The determining unit 13a performs negotiation using the first communication method, and determines whether or not the third information processing device (10, 100) has adapted the second communication method. In this case, a negotiation network based on the first communication method is built.

If it is determined that the third information processing device (10, 100) has not adapted the second communication method, then the equalizing unit 13b performs the equalization operation using the first communication method. In this case, the negotiation network is used, without modification, as an equalization network.

On the other hand, if the determining unit 13a determines that the third information processing device (10, 100) has adapted the second communication method, then the equalizing unit 13c (explained later) performs the equalization operation using the second communication method. In this case, an equalization network based on the second communication method is built separately from the negotiation network.

After the equalization operation performed by the equalizing unit 13b is completed, the equalizing unit 13c performs the equalization operation with respect to the third information processing device 10 using the second communication method, so that a redundancy system is configured using the concerned information processing device 10 and the third information processing device 10.

More particularly, as illustrated in (c) in FIG. 1, after the concerned information processing device 10 has been switched to the active side, the equalizing unit 13c performs the equalization operation with respect to the third information processing device 10, which is used on the standby side, using the general-purpose NIC 11b for equalization purpose that implements communication using the second communication method. As a result, a redundancy system involving the new-type information processing devices 10 is configured at a fast rate and without requiring any downtime.

As illustrated in FIG. 2, the equalizing unit 13c includes an operating-condition equalization function Y for the receiving side, includes an operating-condition equalization function Y for the sending side, and includes a resource reinitializing unit for the functions Y. When the communication method is changed, the resource reinitializing unit performs the initialization operation with respect to the resources such as the memory. For example, when the first communication method is changed to the second communication method for starting the equalization operation with respect to the third information processing device 10, the resource reinitializing unit of the equalizing unit 13c performs the initialization operation.

Meanwhile, the communication methods implemented by the communication control unit 11 for performing communication are not limited to the first communication method and the second communication method explained above. That is, the communication control unit 11 can perform communication using one or more other communication methods different than the first communication method and the second communication method.

In that case, the determining unit 13a selects, from among the communication methods used in the third information processing device (10, 100), one communication method according to a predetermined priority order. Then, the equalizing unit compatible to the selected communication method performs the equalization operation using the selected communication method.

Figure 3:
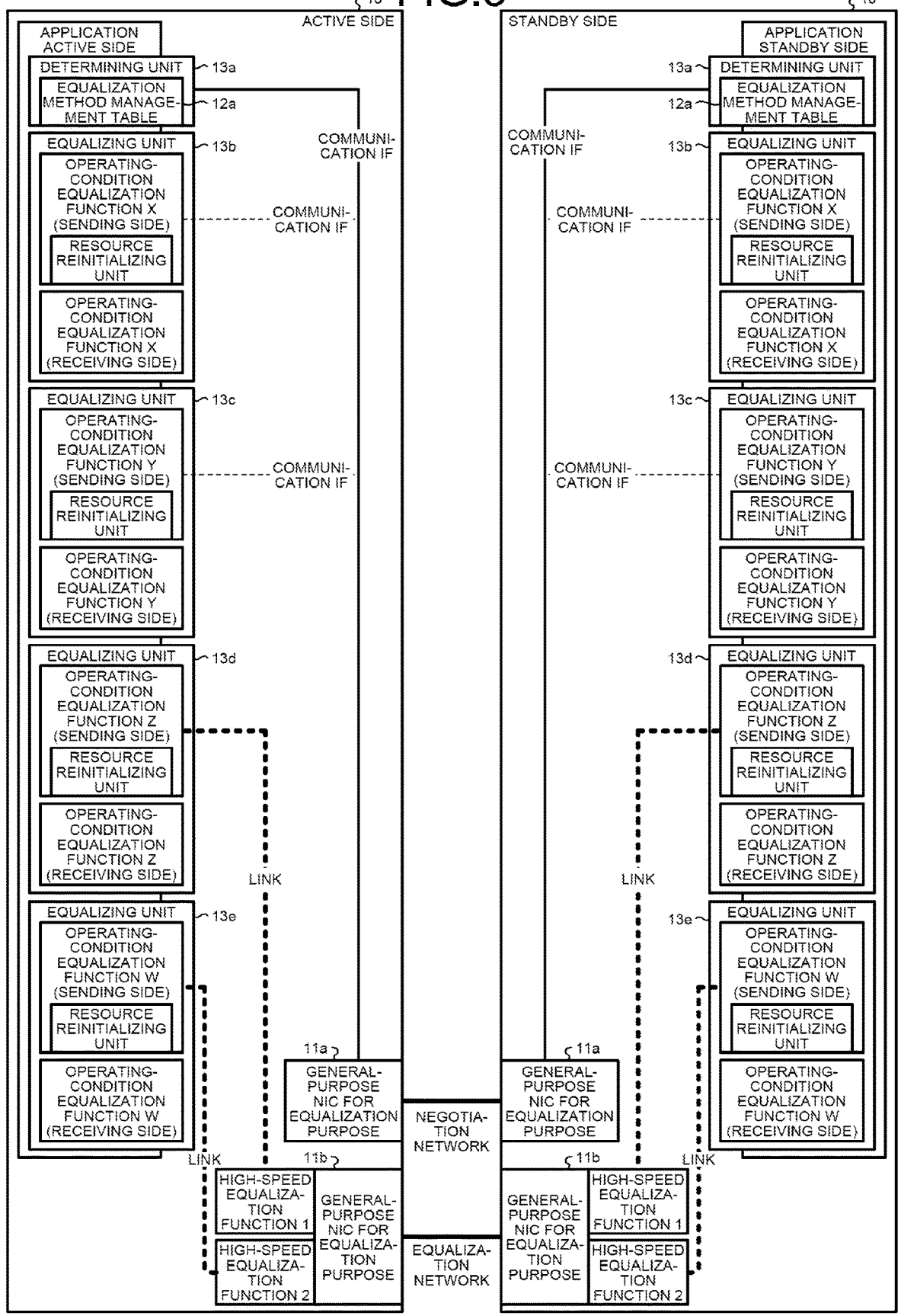
FIG. 3 is a diagram for explaining the information processing device according to the present embodiment.

FIG. 3 is a diagram for explaining the operations performed by the information processing device. In the example illustrated in FIG. 3, the information processing device 10 is capable of performing communication using four communication methods corresponding to the four types of equalization operations performed by equalizing units 13b to 13e.

In this case, as illustrated in FIG. 3, the predetermined priority order is stored in the form of, for example, an equalization method management table 12a in the memory unit 12 of the concerned information processing device 10. Then, from among the communication methods implementable in the information processing devices (10, 100) on the active and standby sides, the determining unit 13a selects the communication method that should be used on priority. At that time, the determining unit 13a refers to the equalization method management table 12a and selects the communication method to be used.

The determining unit 13a can diagnose the communication state of each communication method and, from among the communication methods implementable in the third information processing device (10, 100), can select the communication method according to the predetermined priority order corresponding to the communication states. As a result, for example, it becomes possible to avoid a network corresponding to the communication method that is having trouble in spite of being usually fast, and to perform the equalization operation by dynamically selecting the most suitable communication method.

<Flow of Operations>

Figure 4:
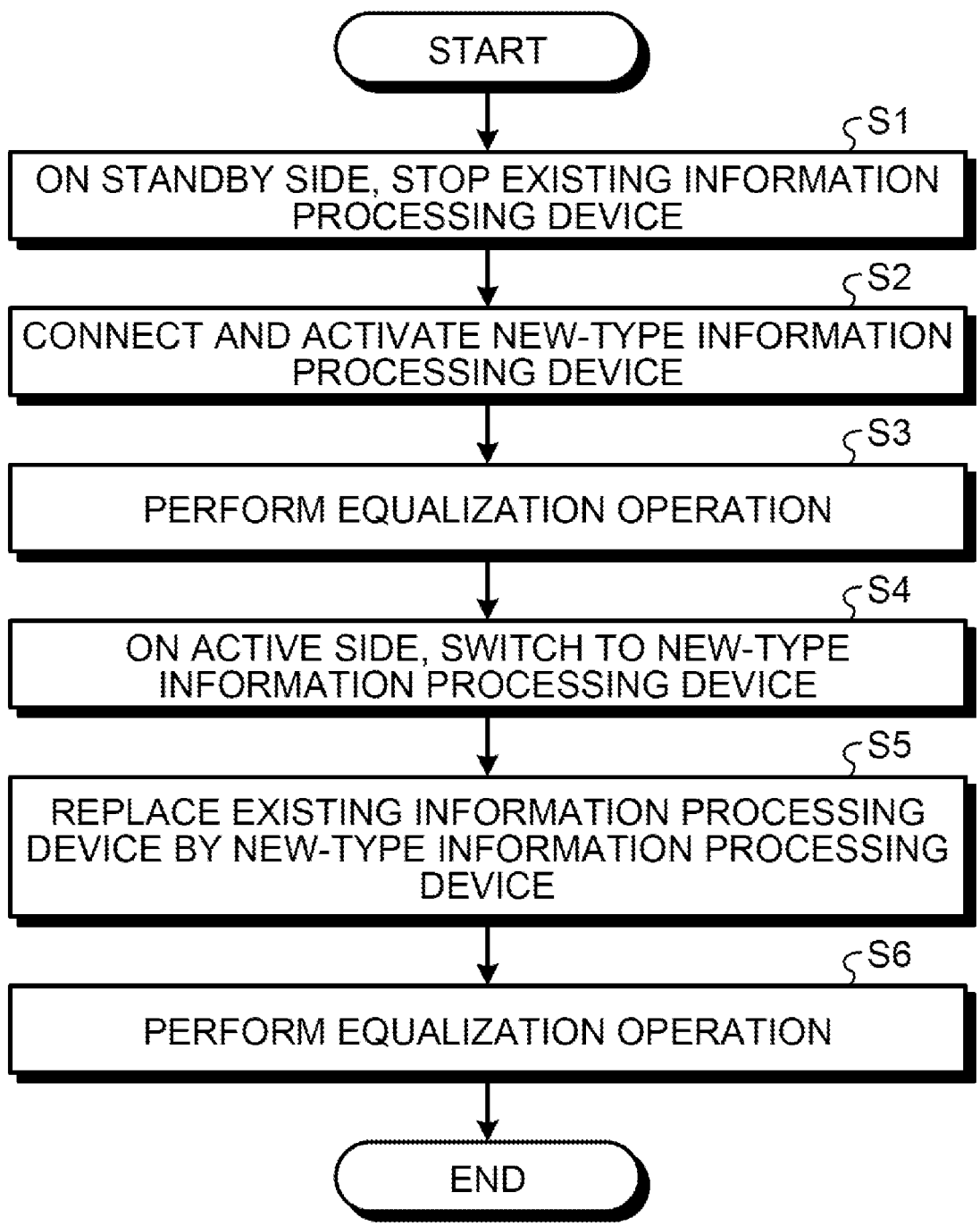
FIG. 4 is a flowchart for explaining the flow of operations performed according to the present embodiment.

FIG. 4 is a flowchart for explaining the flow of operations performed according to the present embodiment. As illustrated in FIG. 4, a user such as an administrator or an operator instructs the start of the redundancy operation.

Firstly, in the existing redundancy system, the information processing device 100 on the standby side is stopped (Step S1). Moreover, to the information processing device 100 on the active side, the information processing device 10 equipped with the high-speed communication function is connected (Step S2). At that time, the information processing device 10 that is connected is automatically set to be on the standby side.

Then, the information processing device 10 on the standby side performs the equalization operation with respect to the information processing device 100 on the active side (Step S3). At that time, in the information processing device 10, the determining unit 13a determines that, from among the existing communication method and the high-speed communication method, the existing communication method is to be used in accordance with the existing information processing device 100. Moreover, the equalizing unit 13b that is compatible to the existing communication method performs the equalization operation via the general-purpose NIC 11a for equalization purpose that is meant for implementing the existing communication method.

After completing the equalization operation with respect to the existing information processing device 100, the information processing device 10 is switched to the active side (Step S4). At that time, the existing information processing device 100 that gets switched to the standby side is stopped.

Moreover, the existing information processing device 100 is replaced by another information processing device 10, and that information processing device 10 is connected to the information processing device 10 on the active side (Step S5). The newly-connected information processing device 10 is automatically set to be on the standby side.

Then, the equalization operation is performed between the information processing device 10 on the standby side and the information processing device 10 on the active side (Step S6). At that time, for example, in the information processing device 10 on the standby side, via the general-purpose NIC 11a for equalization purpose that is meant for implementing the existing communication method, the determining unit 13a performs negotiation about whether to use the existing communication method or the high-speed communication method; and determines that the high-speed communication method is to be used. Then, the equalizing unit 13c that is compatible to the high-speed communication method performs the equalization operation via the general-purpose NIC 11b for equalization purpose that is meant for implementing the high-speed communication method. As a result, the redundancy system configured with the existing information processing devices 100 gets replaced by the redundancy system configured with the information processing devices 10 according to the present embodiment that perform high-speed communication.

<Effect>

As explained above, in the information processing device 10, the communication control unit 11 performs communication using the first communication method and using the second communication method that is faster than the first communication method. The equalizing unit 13b uses the first communication method and performs the equalization operation with respect to the first information processing device 100 in the redundancy system in which redundancy is achieved between the first information processing device 100 and the second information processing device 100 using the first communication method. After the equalizing unit 13*b* completes the equalization operation, the equalizing unit 13*c* uses the second communication method and performs the equalization operation with respect to the third information processing device 10, so that a redundancy system is configured between the concerned information processing device 10 and the third information processing device 10.

As a result, while keeping the process production control system in operation, the redundancy system gets replaced at a fast rate and with reliability. In this way, as a result of using the information processing devices 10 according to the present embodiment, the existing information processing devices 100 in the redundancy system can be replaced by the new-type information processing devices 10 at a fast rate, with reliability, and without requiring any downtime.

Moreover, the determining unit 13*a* performs negotiation using the first communication method, and determines whether or not the third information processing device 10 has adapted the second communication method. If the determining unit 13*a* determines that the third information processing device 10 has adapted the second communication method, then the equalizing unit 13*c* performs the equalization operation using the second communication method. On the other hand, if the determining unit 13*a* determines that the third information processing device 10 has not adapted the second communication method, then the equalizing unit 13*b* performs the equalization operation using the first communication method. As a result, the concerned information processing device 10 becomes able to perform the equalization operation with respect to the other information processing device (10, 100) in an appropriate and reliable manner.

The first communication method and the second communication method have different protocols implemented therein. Moreover, in the equalization operation based on the first communication method and the equalization operation based on the second communication method, the target application for processing has different data formats. Hence, the equalization operation can be performed at a still faster rate.

Moreover, the communication control unit 11 performs communication using one of more other communication methods different than the first communication method and the second communication method. In that case, the determining unit 13*a* selects, from among the communication methods used in the third information processing device 10, the communication method according to a predetermined priority order; and the concerned equalizing unit performs the equalization operation using the selected communication method. As a result, the equalization operation can be performed using the appropriate communication method with a high degree of efficiency.

Furthermore, the determining unit 13*a* diagnoses the communication state of each communication method and, from among the communication methods implementable in the third information processing device 10, selects the communication method according to the predetermined priority order corresponding to the communication states. Then, the concerned equalizing unit performs the equalization operation using the selected communication method. As a result, for example, it becomes possible to avoid a network corresponding to the communication method that is having trouble in spite of being usually fast, and to perform the equalization operation by dynamically selecting the most suitable communication method.

Moreover, the communication control unit 11 performs communication using the first communication method and using the second communication method that is faster than the first communication method. The equalizing unit 13*b* performs the equalization operation (synchronization) using the first communication method. The equalizing unit 13*c* performs the equalization operation using the second communication method. The determining unit 13*a* uses the first communication method and determines whether or not the other information processing device 10 has adapted the second communication method. As a result, it becomes possible to determine the different types of communication methods and the different types of equalization operations, so that an appropriate equalization operation can be performed.

Other Embodiments

Till now, the embodiment of the present invention was described. However, other than the embodiment described above, the present invention can also be implemented in various other forms. For example, the communication control unit 11 can be an NIC having different physical layers corresponding to a plurality of different communication methods. In that case, the existing information processing device 100 can be replaced by the information processing device 10 that includes an NIC having different physical layers than the existing information processing device 100. For example, it is possible to use the information processing device 10 that includes an NIC having different physical layers and having a strengthened bandwidth and an enhanced environment resistance as compared to the existing information processing device 100.

Alternatively, the communication control unit 11 can be an NIC that can be used in common for a plurality of different communication methods. For example, the communication control unit 11 can be implemented using an NIC that combines the general-purpose NICs 11*a* and 11*b* for equalization illustrated in FIG. 1. In that case, the general-purpose NIC 11*a* for equalization purpose is no more required, and a negotiation network for performing negotiation is also no more required.

When the communication control unit 11 is an NIC in which a plurality of physical layers can be used in common for communication of different communication methods; at the time of connecting the concerned information processing device 10 and the existing information processing device 100, a transducer for the physical layers can be temporarily incorporated, so that the information processing device 10 can be used as replacement. In that case, the incorporated transducer can be removed eventually.

<System>

The processing procedures, the control procedures, specific names, various data, and information including parameters described in the embodiments or illustrated in the drawings can be changed as required unless otherwise specified.

Moreover, the constituent elements of the device illustrated in the drawings are merely conceptual, and need not be physically configured as illustrated. The constituent elements, as a whole or in part, can be separated or integrated either functionally or physically based on various types of loads or use conditions.

The process functions implemented in the device are entirely or partially implemented by a CPU or by computer programs that are analyzed and executed by a CPU, or are implemented as hardware by wired logic.

<Hardware>

Figure 5:
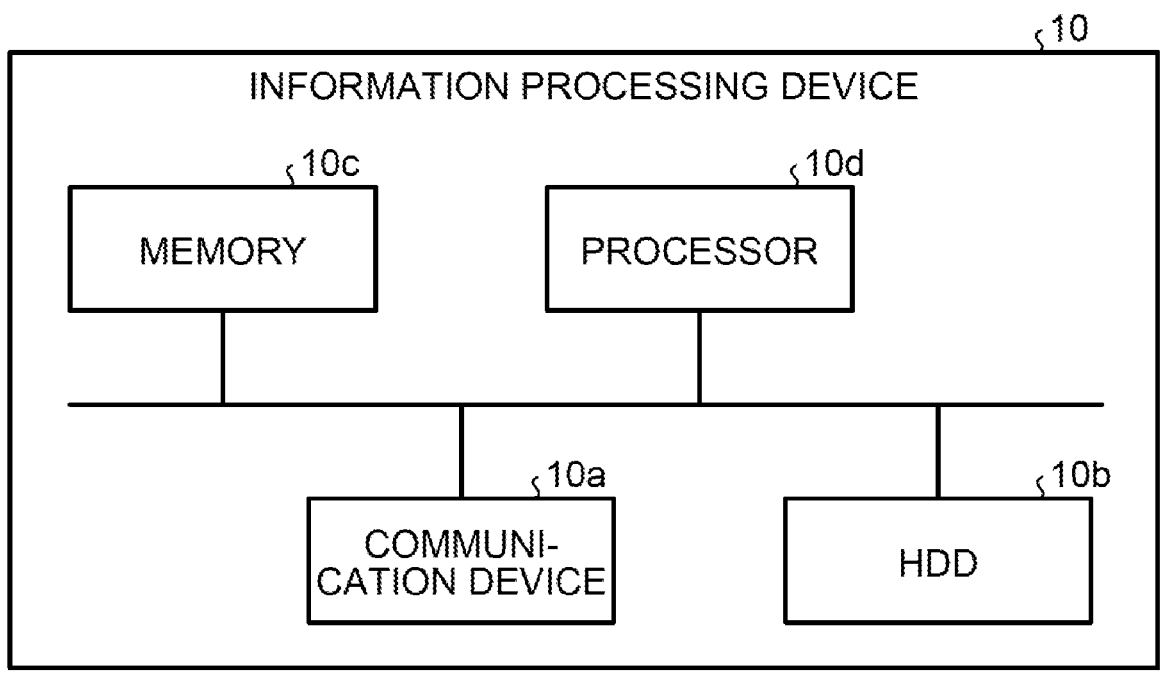
FIG. 5 is a diagram illustrating an exemplary hardware configuration.

Given below is the explanation of an exemplary hardware configuration of the information processing device 10. FIG. 5 is a diagram illustrating an exemplary hardware configuration. As illustrated in FIG. 5, the information processing device 10 includes a communication device 10*a*, a hard disk drive (HDD) 10*b*, a memory 10*c*, and a processor 10*d*. Moreover, the constituent elements illustrated in FIG. 5 are connected to each other by a bus.

The communication device 10*a* is a network interface card that performs communication with other servers. The HDD 10*b* is used to store a computer program meant for implementing the functions illustrated in FIG. 2, and to store databases.

The processor 10*d* reads, from the HDD 10*b*, the computer program meant for implementing identical operations to the processing units illustrated in FIG. 2; loads the computer program in the memory 10*c*; and runs processes that implement the functions explained with reference to FIG. 2. For example, the processor implements the functions identical to the processing units of the information processing device 10. More particularly, the processor 10*d* reads, from the HDD 10*b*, the computer program having identical functions to the determining unit 13*a* and the equalizing units 13*b* to 13*e*. Then, the processor 10*d* runs processes that perform identical operations to the determining unit 13*a* and the equalizing units 13*b* to 13*e*.

In this way, the information processing device 10 operates as an information processing device that implements the redundancy method by reading and executing a computer program. Meanwhile, the information processing device 10 can read the computer program alternatively from a recording medium using a medium reading device, and can execute the computer program to implement the functions identical to the embodiment described above. Herein, the computer program is not limited to be executed in the information processing device 10. Alternatively, for example, the present invention can be implemented even when the computer program is executed by some other computer or server, or even when the computer program is executed in cooperation among such devices.

The computer program can be distributed via a network such as the Internet. Alternatively, the computer program can be recorded in a computer-readable recording medium such as a hard disk, a flexible disc (FD), a compact disc read only memory (CD-ROM), a magneto-optical disk (MO), or a digital versatile disc (DVD). Then, a computer can read the computer program from the recording medium and execute it.

According to an aspect of the present invention, the existing information processing devices in a redundancy system can be replaced by new-type information processing devices without requiring any downtime.

What is claimed is:

1. A redundancy method implemented in an information processing device that performs communication using a first communication method and using a second communication method whose communication speed is higher than the first communication method, the redundancy method comprising:

performing a first equalization of data and operating condition of an application for processing using the first communication method through a first network interface with respect to a first information processing device in a redundancy system in which redundancy is achieved between the first information processing device and a second information processing device using the first communication method through the first network interface; and building that includes
performing, after completion of the first equalization, a second equalization of data and operating condition of the application for processing using the second communication method with respect to a third information processing device, and building a redundancy system in which the second information processing device and the third information processing device are used, and determining that includes
performing negotiation using the first communication method through the first network interface, and determining whether or not the third information processing device has adapted the second communication method, wherein in a case where it is determined that the third information processing device has adapted the second communication method, the second equalization is performed using the second communication method through a second network interface between the second information processing device and the third information processing device, and in a case where it is determined that the third information processing device has not adapted the second communication method, the second equalization is performed using the first communication method through the first network interface between the second information processing device and the third information processing device.

2. The redundancy method according to claim 1, wherein the first communication method and the second communication method have different protocols implemented therein.

3. The redundancy method according to claim 2, wherein, data format of target application for processing is different in equalization performed using the first communication method than in equalization performed using the second communication method.

4. The redundancy method according to claim 1, further comprising performing communication using one or more communication methods that are different than the first communication method and the second communication method, wherein from among communication methods adapted in the third information processing device, equalization is performed using communication method selected according to predetermined priority order.

5. The redundancy method according to claim 4, further comprising diagnosing state of communication of each of the communication methods, wherein from among communication methods adapted in the third information processing device, equalization is performed using communication method selected according to predetermined priority order corresponding to state of communication.

6. A non-transitory computer-readable recording medium having stored therein a redundancy program, wherein the redundancy program causes a computer to execute:

performing communication using a first communication method and using a second communication method whose communication speed is higher than the first communication method;

performing a first equalization of data and operating condition of an application for processing using the first communication method through a first network interface with respect to a first information processing device in a redundancy system in which redundancy is achieved between the first information processing device and a second information processing device using the first communication method through the first network interface; and building that includes
- performing, after completion of the first equalization, a second equalization of data and operating condition of the application for processing using the second communication method with respect to a third information processing device, and
- building a redundancy system in which the second information processing device and the third information processing device are used, and determining that includes
- performing negotiation using the first communication method through the first network interface, and
- determining whether or not the third information processing device has adapted the second communication method, wherein in a case where it is determined that the third information processing device has adapted the second communication method, the second equalization is performed using the second communication method through a second network interface between the second information processing device and the third information processing device, and in a case where it is determined that the third information processing device has not adapted the second communication method, the second equalization is performed using the first communication method through the first network interface between the second information processing device and the third information processing device.

7. An information processing device comprising:

a memory storing a program; and one or more processor by executing the program to realize:

a communication controller that performs communication using a first communication method and using a second communication method that whose communication speed is higher than the first communication method;

a first equalizer;

a second equalizer; and a determiner that uses the first communication method and determines whether or not other information processing device has adapted the second communication method, wherein the first equalizer performs a first equalization of data and operating condition of an application for processing using the first communication method through a first network interface with respect to a first information processing device in a redundancy system in which redundancy is achieved between the first information processing device and the information processing device as a second information processing device using the first communication method through the first network interface, and after the first equalization is completed by the first equalizer, the second equalizer
- performs a second equalization of data and operating condition of the application for processing using the second communication method with respect to a third information processing device, and
- builds a redundancy system in which the second information processing device and the third information processing device are used, the determiner
- performs negotiation using the first communication method through the first network interface, and
- determines whether or not the third information processing device has adapted the second communication method,
- in a case where it is determined that the third information processing device has adapted the second communication method, the second equalization is performed using the second communication method through a second network interface between the second information processing device and the third information processing device, and
- in a case where it is determined that the third information processing device has not adapted the second communication method, the second equalization is performed using the first communication method through the first network interface between the second information processing device and the third information processing device.

* * * * *